United States Patent [19]
Kitchener et al.

[11] Patent Number: 5,492,461
[45] Date of Patent: Feb. 20, 1996

[54] SEPARATOR VESSEL

[75] Inventors: Anthony J. Kitchener; Michael Hinze, both of Richmond, Australia

[73] Assignee: Cash Engineering Research Pty.Ltd., Victoria, Australia

[21] Appl. No.: 284,593

[22] PCT Filed: Feb. 12, 1993

[86] PCT No.: PCT/AU93/00062

§ 371 Date: Aug. 10, 1994

§ 102(e) Date: Aug. 10, 1994

[87] PCT Pub. No.: WO93/16283

PCT Pub. Date: Aug. 19, 1993

[30] Foreign Application Priority Data

Dec. 14, 1992 [AU] Australia ................. PL0894

[51] Int. Cl.$^6$ ............................................. F01C 21/04
[52] U.S. Cl. .................. 418/85; 418/100; 418/DIG.1; 55/465; 55/466; 55/DIG. 17
[58] Field of Search ................. 418/83, 85, 89, 418/100, DIG. 1; 55/462, 465, 466, DIG. 17

[56] References Cited

U.S. PATENT DOCUMENTS

| | | | |
|---|---|---|---|
| 2,495,601 | 1/1950 | Rawson | 418/100 |
| 3,291,385 | 12/1966 | Williams et al. | 418/85 |
| 4,070,166 | 1/1978 | Emanuelsson . | |
| 4,475,876 | 10/1984 | Olen | 418/85 |
| 4,553,906 | 11/1985 | Boller et al. | 418/DIG. 1 |
| 4,668,252 | 5/1987 | Gerdau . | |
| 5,029,448 | 7/1991 | Carey . | |
| 5,116,207 | 5/1992 | Doolittle et al. . | |

FOREIGN PATENT DOCUMENTS

| | | | |
|---|---|---|---|
| 284787 | 5/1964 | Australia . | |
| 0186776 | 7/1986 | European Pat. Off. | 418/85 |
| 1041751 | 9/1983 | U.S.S.R. | 418/DIG. 1 |

*Primary Examiner*—Charles Freay
*Attorney, Agent, or Firm*—Bell, Seltzer, Park & Gibson

[57] ABSTRACT

A flooded compressor system has a compressor unit (10) with intermeshing rotors and a separator (12) for retaining a volume of liquid. The separator (12) is arranged to receive compressed gas and liquid discharged from the compressor unit (10) through an outlet (17) and is formed solely by a single length of pipe of substantially uniform cross section which has a first substantially horizontal portion (19) to retain a liquid pool (18) and a second elevated portion (23) connected to the first portion by a bend in the pipe. A compressed gas outlet (25) leads from the second elevated portion to a separate filter element (14), and a liquid filter element (30) is mounted from, and communicates directly with the first horizontal portion of the pipe.

27 Claims, 9 Drawing Sheets

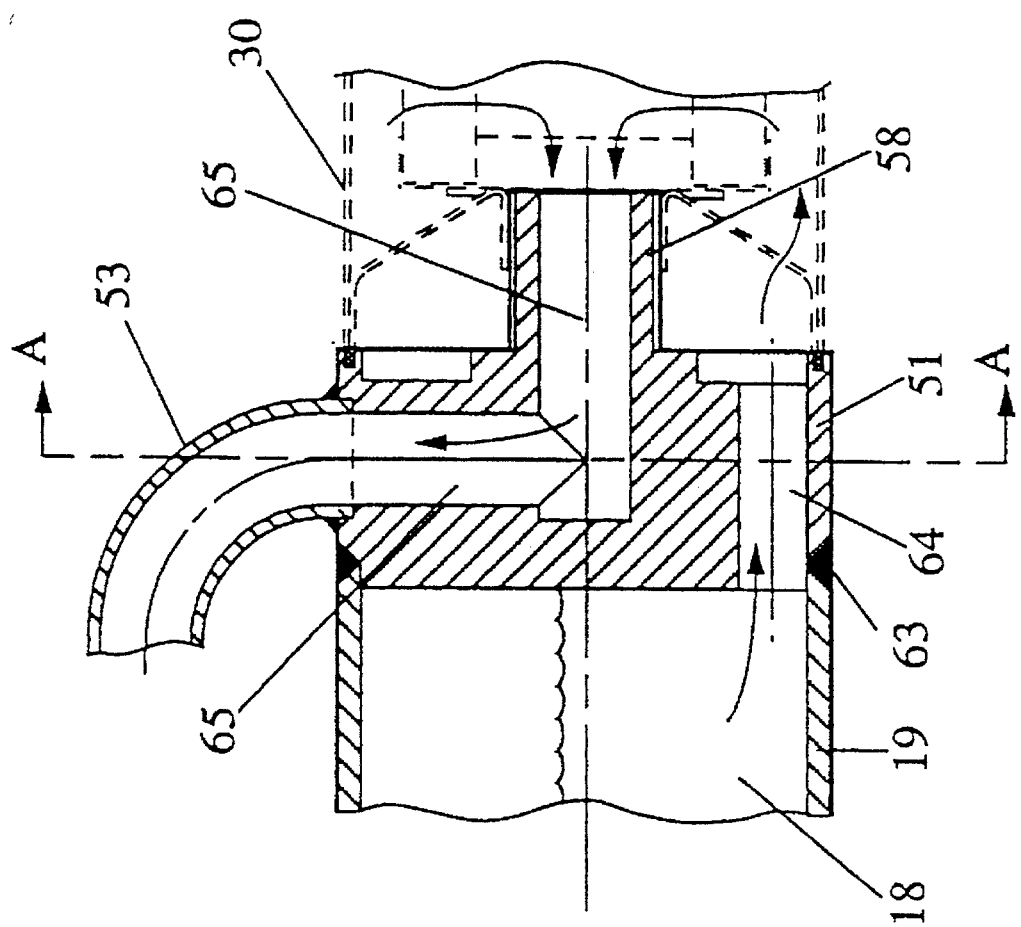
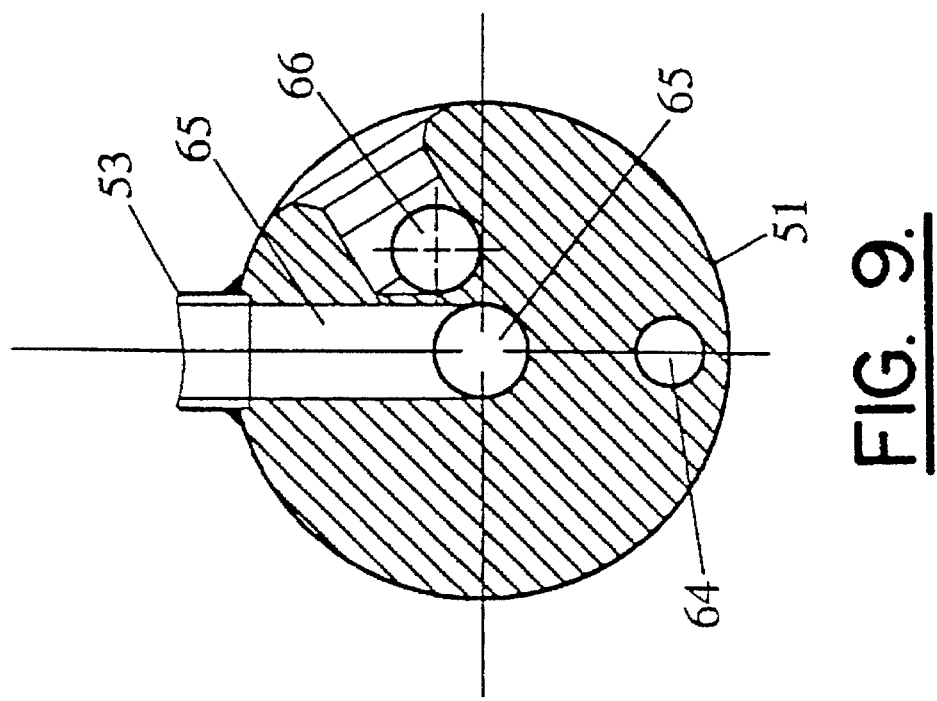

SEPARATOR VESSEL

BACKGROUND OF THE INVENTION

The present invention relates to improvements in compressors or their component parts and particularly to flooded compressor systems employing screw rotors or similar inter-engaging rotating parts to effect compression of a gas.

Systems of the aforementioned kind conventionally comprise a number of major component parts including a compressor unit including inter-engaging rotors adapted to receive the gas (normally air) to be compressed through an inlet filter and a main throttle valve. Lubricating oil for the rotors is also introduced into the compressor unit adjacent its inlet zone and a mixture of compressed gas and oil is discharged from this unit to be separated in a separator vessel. Oil collected in the separator vessel is returned via an oil filter and an oil cooler to the compressor unit inlet zone and clean compressed gas is discharged usually to a receiving vessel from which it is withdrawn as desired by an end user. The discharged compressed gas is normally passed through a coalescent type final filter to remove any remaining fine oil droplets. This filter element is commonly housed within the main separator vessel or within an extension of the main separator vessel manufactured for the purpose of containing the filter element. Problems associated with this conventional positioning of the filter element are discussed in European Patent No. 0,121,999. There are a number of difficulties associated with conventional arrangements of compressor systems of the aforementioned kind. These include the physical size of the system which may include two relatively large pressure tanks, one acting as the separator vessel and the other forming the clean gas receiving vessel. A further problem is associated with the oil cooler which commonly comprises a pair of header manifolds interconnected by a plurality of finned heat exchange tubes through which the oil must pass after being discharged from the separator vessel. A still further problem with conventional arrangements is the number of pipes or lines that must be used to interconnect various component parts in the system and more particularly the number of fluid tight joints, (many operating under high pressure conditions) that need to be formed and then checked for operational performance during manufacture of such systems. Generally speaking it is considered highly desirable to reduce the inventory of parts needed in such systems which has beneficial effects both on material costs and labour costs in the manufacturing process.

U.S. Pat. No. 4,668,252 to Alfred Gerdau filed on the 13th June, 1985, discloses a separator for compressor systems of the aforementioned type wherein the vessel of the separator is not a large pressure tank but rather is formed by two pipes welded together to define an inner volume in a general D shape. The pipe of the upright leg of the D shape contains, at its upper end, an annular final filter element through which compressed gas flows to a clear compressed gas outlet at the top end of the upright leg. The lower zone formed by the lower end of the upright leg and the lateral branch pipe therefrom provides a sump for collection of oil for ultimate return to a compressor unit. The configuration of the disclosed separator vessel of U.S. Pat. No. 4,668,252 suffers from a number of practical disadvantages while still providing a more compact vessel than the conventional large pressure tank. Firstly, the vessel is formed by two pipe lengths which must be fabricated together by pressure resistant welds to provide the oil collection sump which add to overall manufacturing costs. Secondly, the upright configuration of the vessel with two relatively small volume upright passages leading to the final filter element provide an easy route for foaming oil to flow into contact with and thereby damage the final filter element. As a result, the compressor system would be required to operate with severely restricted oil volumes. Thirdly, because the filter element is housed within the upright leg of the vessel, it is necessarily axially very long to provide the required final filter flow area. This brings the filter element much closer to the oil level in the lower sump zone than would be desirable which exacerbates the aforementioned oil foaming problem. To be able to shorten the axial length of the filter element, it would be necessary to utilise pipes with much larger diameters which increases manufacturing costs.

SUMMARY OF THE INVENTION

According to a first aspect of the present invention, there is provided a flooded compressor system for delivering clean compressed gas to an external end user, said system comprising a compressor unit utilising intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a liquid retaining zone formed solely by a length of pipe or conduit having a substantially uniform cross-section along its axial length, said pipe or conduit having a first bend intermediate opposed longitudinal end regions of the pipe or conduit whereby said first bend connects a first substantially horizontal portion of the pipe or conduit defining a liquid holding zone to a second portion of said pipe or conduit extending therefrom to an elevated position located above said first portion, said second portion defining a compressed gas zone, said separator vessel having a vessel inlet means for receiving liquid containing compressed gas from said compressor unit into said second portion of the pipe or conduit and vessel gas outlet means communicating with said second portion of the pipe or conduit, said vessel gas outlet means also communicating with said filter means with said filter means being located externally of said separator vessel.

Conveniently, the vessel inlet means is provided to one of said first or second portions enabling connection of a communication line or passage from said compressor unit whereby a mixture of compressed gas and liquid may be delivered to said separator. Conveniently, the vessel outlet means is provided leading from the second portion or leading from a third portion in communication with said second portion enabling discharge of either clean compressed gas or substantially clean compressed gas mixed with a minor amount of liquid therefrom.

By using a length of pipe or conduit as aforesaid, the production of a separate tank as a pressure vessel is avoided. Moreover, a simplified vessel construction is achieved that minimises the number of pressure resistant welds required to branch pipe sections. The ends of the pipe or conduit may be closed by simple flat plate or block ends through which fluid connections may be easily made as desired. It is of course necessary to have an elevated zone located above a lower zone containing a pool of liquid (lubricating oil) and this is achieved simply by means of bending a length of pipe rather than by some manufacturing technique such as cutting and welding parts together which is not only more costly in manufacture but requires the welds to be thoroughly checked as the vessel is of course under considerable internal pressure in use.

The arrangement of the final filter means being disposed externally of the separator vessel, said filter means allows smaller diameter pipes or conduits to be used in the construction of the separator vessel itself while at the same time permitting standard size annular final filter elements, that is the diameter of the filter element need no longer be related to the diameter of the pipes or conduits forming the separator vessel.

In a still further preferred arrangement, the separator may include liquid cooler means formed therewith, the cooler means including at least one liquid discharge passage leading from the interior volume of said vessel within the first zone, a heat exchange means arranged to receive liquid from the or each said liquid discharge passage to cool said liquid. The arrangement thus defined avoids the necessity of having a cooler unit produced as a separate part requiring connection lines and pressure joints leading from the separator vessel.

According to a still further aspect of the present invention, there is provided a separator for a flooded compressor of the type including a compressor unit utilising intermeshing rotors, said separator vessel defining an interior volume and being formed by at least one length of pipe or conduit having a lower liquid retaining zone adjacent one axial end of a length of said pipe or conduit, said axial end having an end member adapted to mount a liquid filter means thereto so that, in use, liquid from said lower liquid retaining zone may flow directly into and through said liquid filter means. Such an arrangement permits oil to flow directly from the separator vessel into the oil filter without the need of separate pipes and pressure joints. Moreover, a simple end plate or block can be used to both close the end of the pipe forming the first potion of the separator vessel and to distribute liquid flow through the filter and thereafter to a suitable cooling means. Advantageously, the liquid filter means is conveniently placed for removal and replacement when desired and also to allow liquid to be readily drained from the system to be replaced at appropriate use intervals.

According to a still further aspect of the present invention, there is provided a compressor system comprising a flooded compressor unit utilising intermeshing rotors and a separator as defined in the preceding paragraphs. Conveniently, the compressor system also includes a drive motor driving said compressor unit with the separator vessel receiving a mixture of compressed gas and oil from the compressor unit. Preferably, the pipe or conduit forming the separator also provides a support platform from which said compressor unit and/or said drive motor is directly or indirectly mounted. Preferably the pipe or conduit includes a part that, in use, is arranged in a horizontal plane. By using a length of pipe or conduit as the separator vessel, it is possible to bend the pipe or conduit to provide a stable base section from which the remaining components of the system may be directly or indirectly mounted thereby avoiding or minimising the number of super structure or frame parts necessary to support and hold the compressor system package together.

Throughout this specification the word "oil" is used to identify a natural or synthetic liquid adapted for use as a lubricant fluid in a flooded compressor system.

DESCRIPTION OF THE DRAWINGS

Several preferred embodiments of the present invention will hereinafter be described with reference to the accompanying drawings, in which:

FIG. 8 is a partial longitudinal section view of the end plug and oil filter shown in FIGS. 6 and 7; and FIG. 9 is a cross-section along line A—A of FIG. 8.

DETAILED DESCRIPTION OF THE PREFERRED EMBODIMENTS

Figure 1:
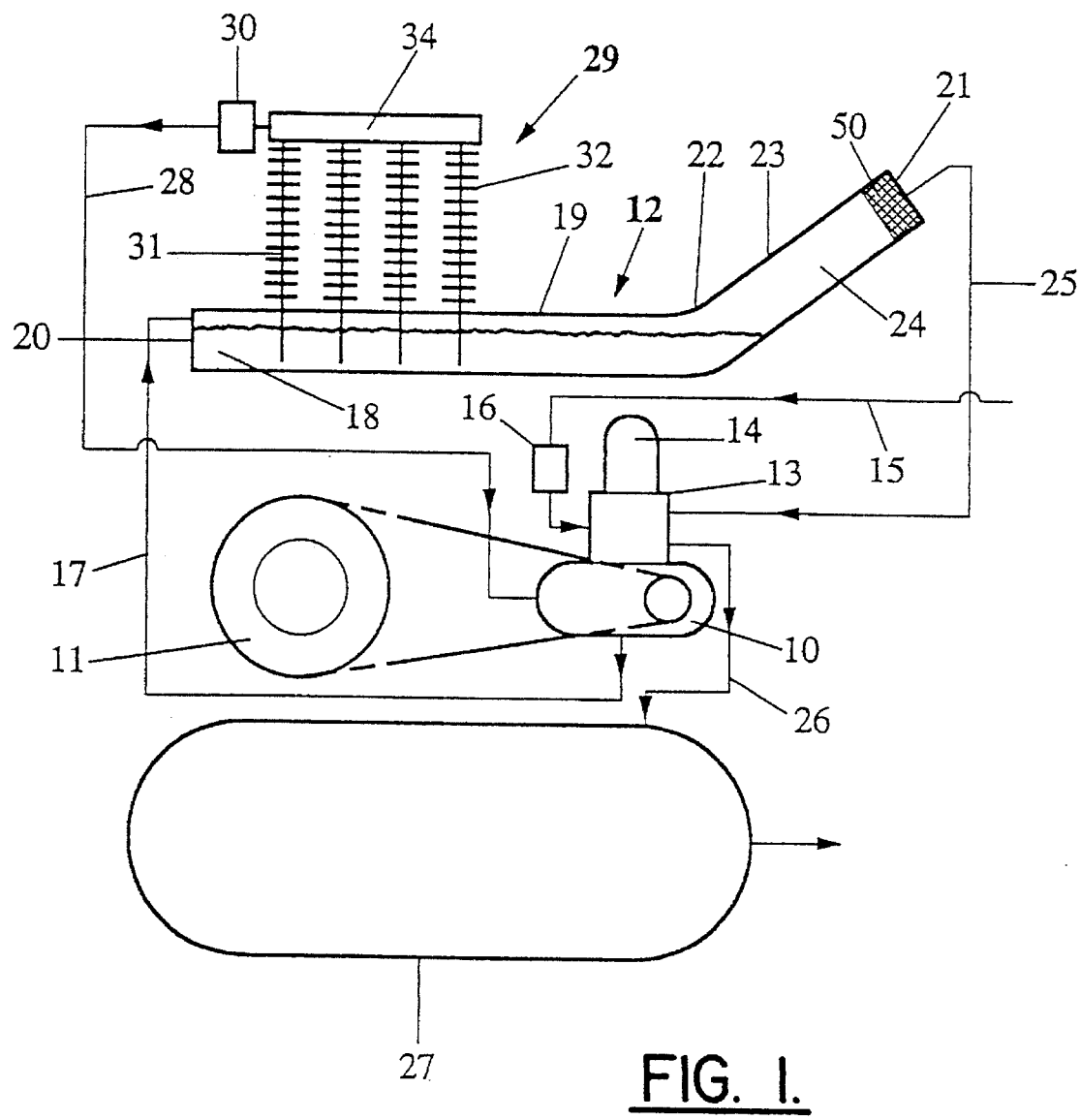
FIGS. 1 and 1A are schematic flow diagrams showing alternative arrangements of a compressor system package utilising the present invention.

Referring first to FIG. 1, the compressor system package design comprises a flooded compressor unit 10 utilising intermeshing rotors and driven by a drive motor 11. A combination main inlet throttle valve 13 and final filter element 14 is provided according to Australian Patent Application No. PK8876 and is preferably provided to deliver ambient air via line 15 and filter 16 to the inlet of the compressor unit 10. Other more conventional arrangements could also be employed. A separator vessel 12 is provided to receive a mixture of compressed gas and oil (via the line 17) from the compressor unit 10. As a result a pool of oil 18 is maintained in a first horizontal portion 19 of the vessel 12. The vessel 12 is preferably formed from a pipe or conduit and is closed by plain end pieces 20 and 21 at opposed ends welded to the pipe itself. Conveniently fluid connections are made through these end walls 20,21. The pipe or conduit is preferably bent at 22 part way along its length to form a second portion 23 of the vessel which provides an elevated zone 24 adapted to contain compressed gas and perhaps some small remaining droplets of oil. This mixture is then delivered to a line 25 after passing through a primary separation means 50 such as a wad of YORKMESH (Registered Trade Mark). The line 25 passes the final filter element 14 where any remaining oil is removed and the clean compressed gas is delivered via the valve structure 13 and a passage means 26 to the receiving-vessel 27. Thereafter cleaned compressed gas may be withdrawn from the vessel 27 as desired by an end user. Oil from the pool 18 is returned to the compressor unit 10 via line 28 and an oil cooler 29 and an oil filter 30. The oil cooler 29 may include a plurality of tubes 31 extending through an upper wall of the horizontal first portion 19 of the vessel 12 ending in open ends located adjacent a lower wall of the horizontal first portion 19. The tubes 31 have heat exchange fins 32 or the like outwardly of the vessel 12 so that heat from oil passing up the tubes 31 is transferred to the atmosphere. This process is enhanced by providing a fan 33 driven by the motor 11 (see FIG. 2) to increase the air flow over the heat exchange fins 32. The tubes 31, at upper ends, lead into a header tube or manifold 34 so that the oil can be returned therefrom through the oil filter 30 to line 28.

Figure 1A:
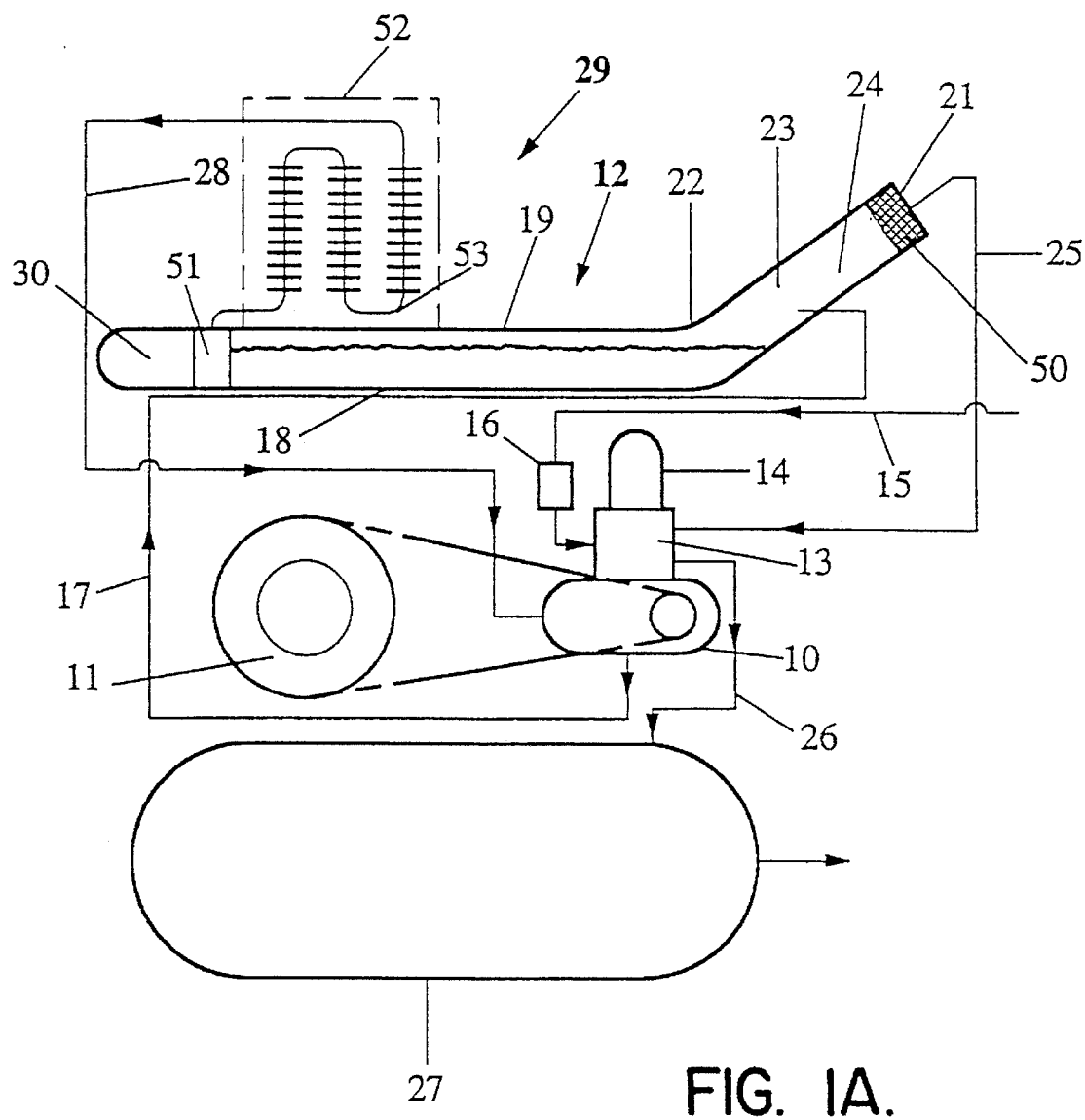
Figure 2:
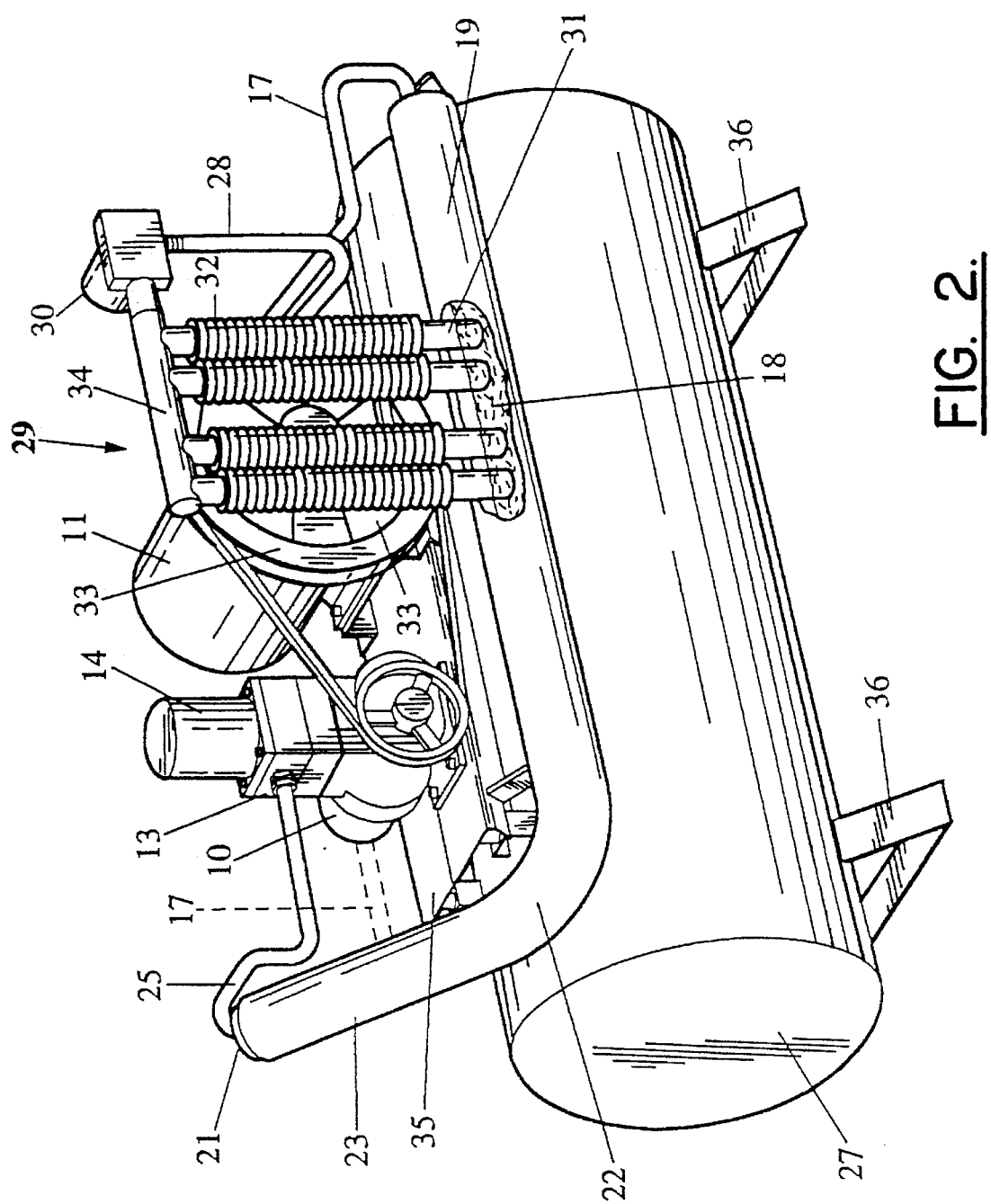
FIG. 2 is a partly broken away perspective view of a compressor system package according to FIG. 1.

FIG. 1A illustrates a modification of the system generally disclosed and described above in relation to FIG. 1. In FIG. 1A the line 17 directing compressed gas and oil from the compressor unit 10 to the separator vessel 12 enters the vessel in the second (elevated) portion 23. This has the advantage of preventing the flow of compressed gas across the surface of the oil pool as is necessary in the embodiment of FIG. 1 and also, in practice substantially reduces the length and complication of the pipe 17 as is shown in FIG. 2. The pipe 17 for the embodiment of FIG. 1A is shown in FIG. 2 in dotted outline whereas the full outline pipe 17 in FIG. 2 is the pipe required for the embodiment of FIG. 1. Further, in FIG. 1A, the oil filter 30 is directly mounted to an end closure member 51 of the separator vessel 12. This arrangement allows simple liquid distribution passages to be formed in the member 51 to direct oil through the filter 30 and thereafter to a cooler unit 52 which in this case is a serpentine finned pipe 53 leading to the oil return pipe 28. These arrangements are described in more detail hereinafter with reference to FIGS. 6 to 9.

Figure 3:
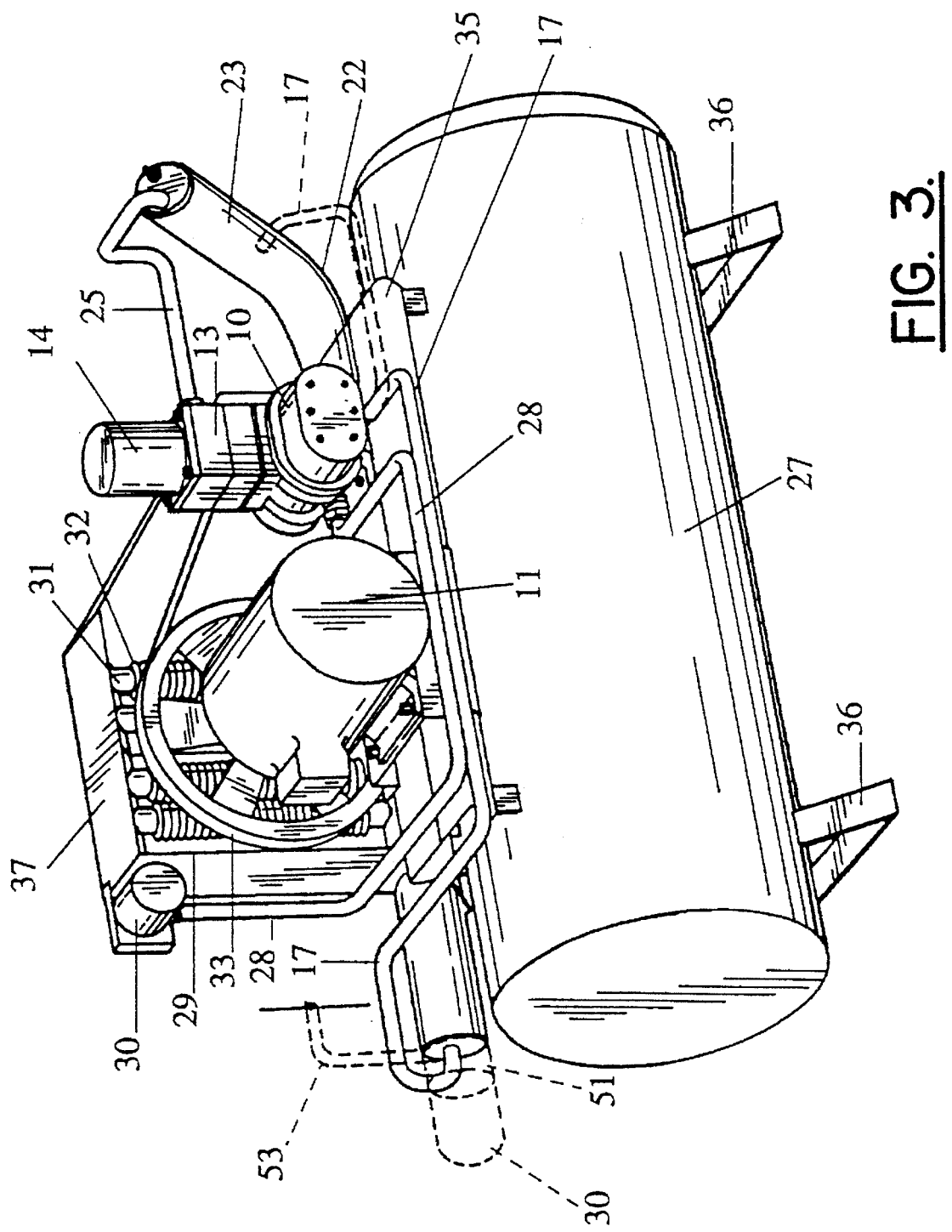
FIG. 3 is a rear perspective of the compressor system package of FIG. 2 including a protective casing over part of the system.

As can be best seen in FIG. 2 and 3, the compressor unit 10 and drive motor 11 are conveniently mounted on a platform 35 secured to the receiving vessel 27, the receiving vessel 27 being supported on legs 36 thereby avoiding the necessity of a separate frame structure to support the various components. In this manner, a lighter and less expensive package is produced. Moreover, the horizontal section 19 of the separator vessel 12 can be arranged with its axis parallel to the axis of the vessel 27 so that the tubes 31 of the oil cooler 29 extend upwardly adjacent to the motor 11. Thus the fan 33 can be directly mounted to the drive motor to blow air over the heat exchange fins 32. The casing 37 (FIG. 3) both protects the cooler parts and assists in ensuring maximum air flow over the tubes 31. The configuration illustrated in FIGS. 1, 1A, 2 and 3 provide a small compressor system package that is relatively cheap to produce because of the components used and the minimum number of interconnecting pipes and joints needed in the assembly.

FIGS. 4 to 9 of the accompanying drawings illustrate alternative configurations of compressor system packages or parts thereof embodying one or more of the features previously discussed as forming part of the present invention. Like features have been given the same reference numerals as in FIGS. 1 to 3.

Figure 4:
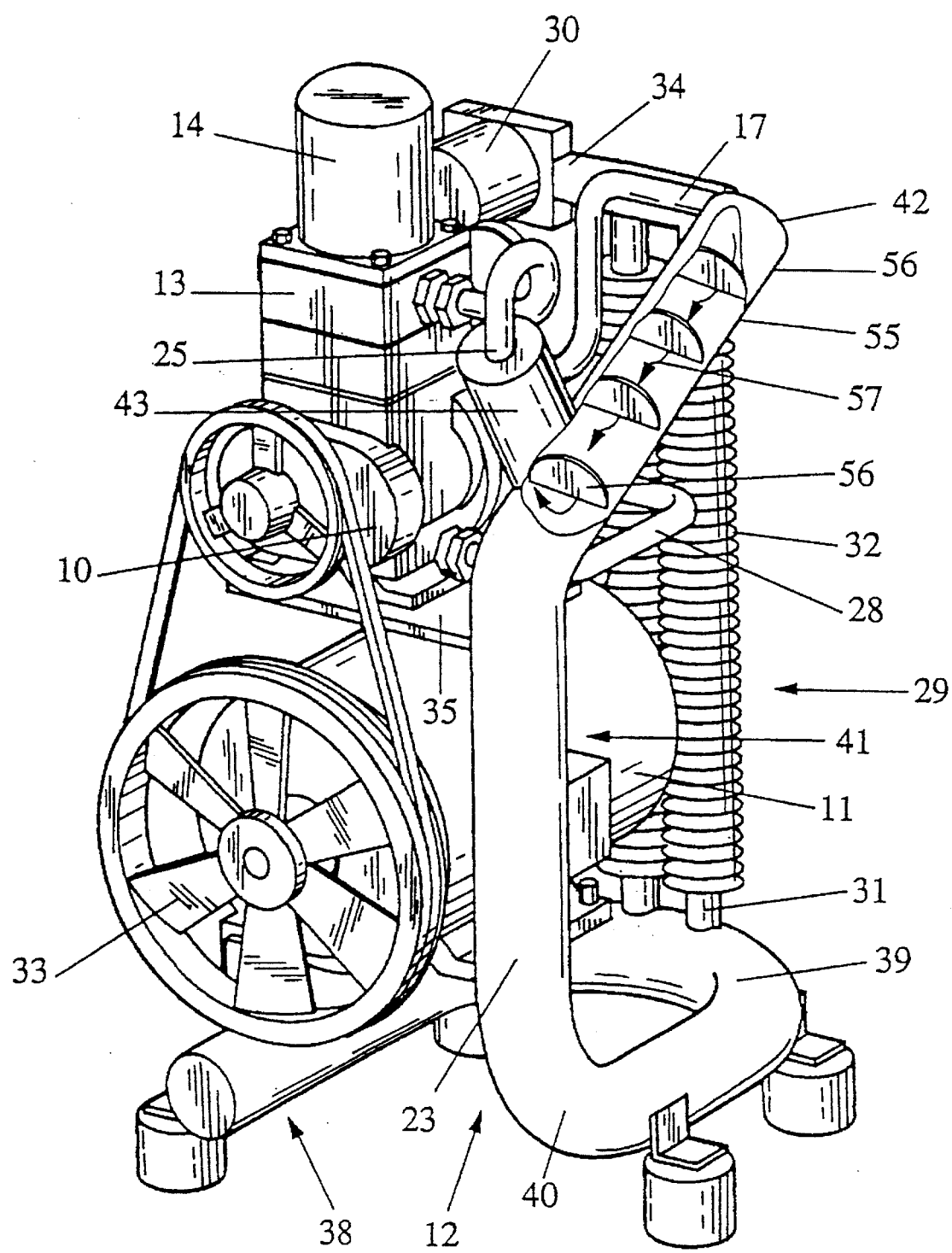
FIGS. 4 and 5 are front and rear perspective views of an alternative compressor system package designs.
Figure 5:
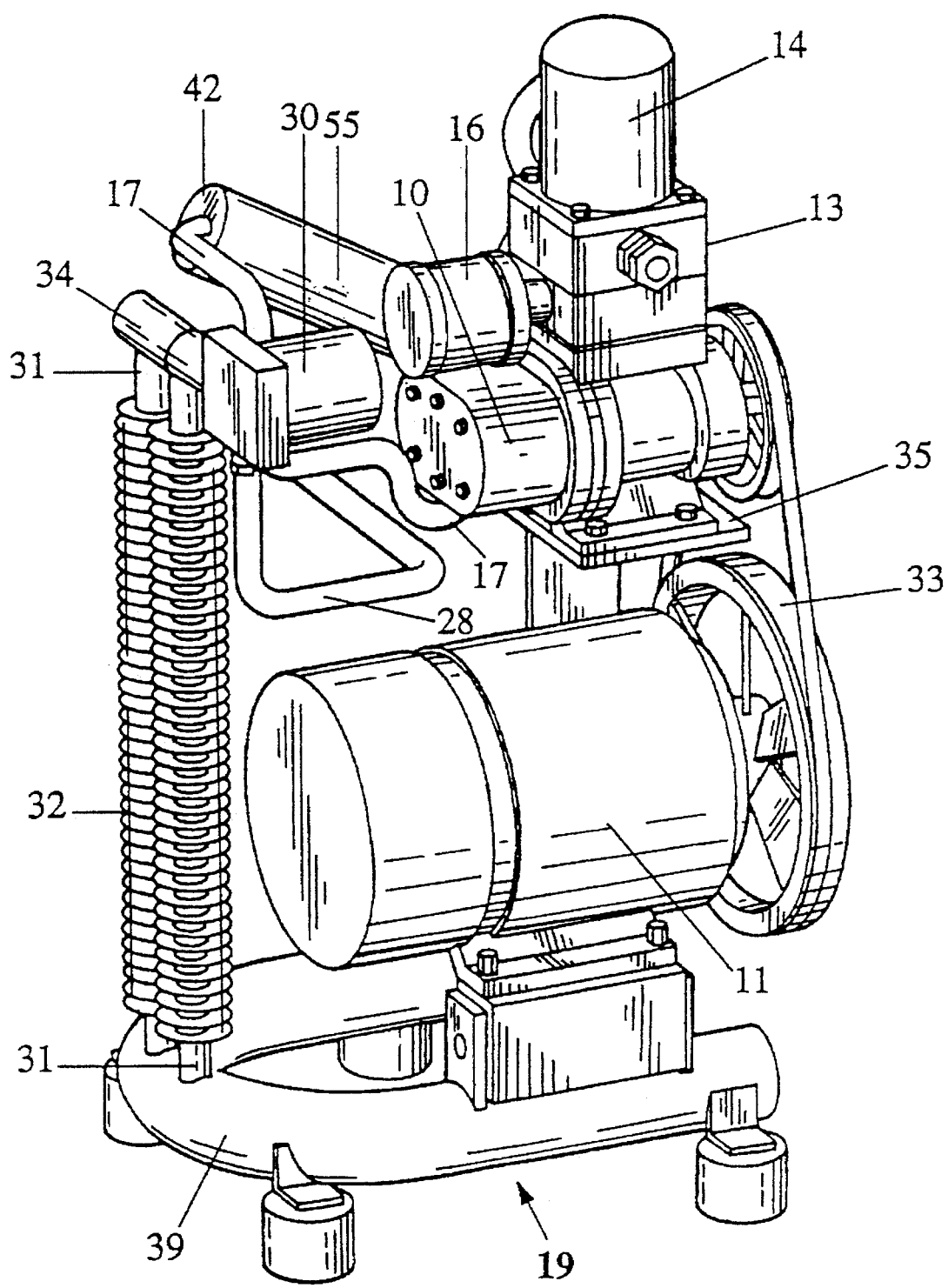

Referring to FIGS. 4 and 5, a compressor system configuration is disclosed wherein the separator vessel 12 is formed from a pipe with a first section 19 having two lengths of pipe or conduit joined by a bend 39 such that a generally horizontal platform is created on which the remaining components of the system are mounted. A second bend 40 in the pipe forms an elevated section 41 of the separator vessel 12. In this embodiment, the line 17 delivering a mixture of compressed gas and oil from the compressor unit 10, enters the vessel 12 at an upper end 42 of the bent pipe forming the vessel. A branch pipe section 43 at an upper level is provided from which compressed gas (and small amounts of remaining entrained oil) is removed to be delivered to the final filter element 14 via the valve structure 13. Oil entering the vessel 12 via the line 17 with the compressed gas runs down the elevated section 41 to form a pool in the base section 38 of the vessel. The upper section 55 of the vessel 12 may include a series of baffles 56 to slow the movement of the compressed gas (shown by arrows 57 so that the gas will flow into the branch section 43, through a primary separation means (not shown) similar to the YORKMESH of FIGS. 1 and 1A, to the pipe 25. The motor 11 is mounted from the vessel 12 with the compressor unit vertically above the motor 11. The oil cooler 29 extends upwardly from the bend 39 of the pipe in the base section 38 of the vessel 12 so that the fan 33 may blow air around the motor 11 and over the heat exchanger fins 32.

Figure 6:
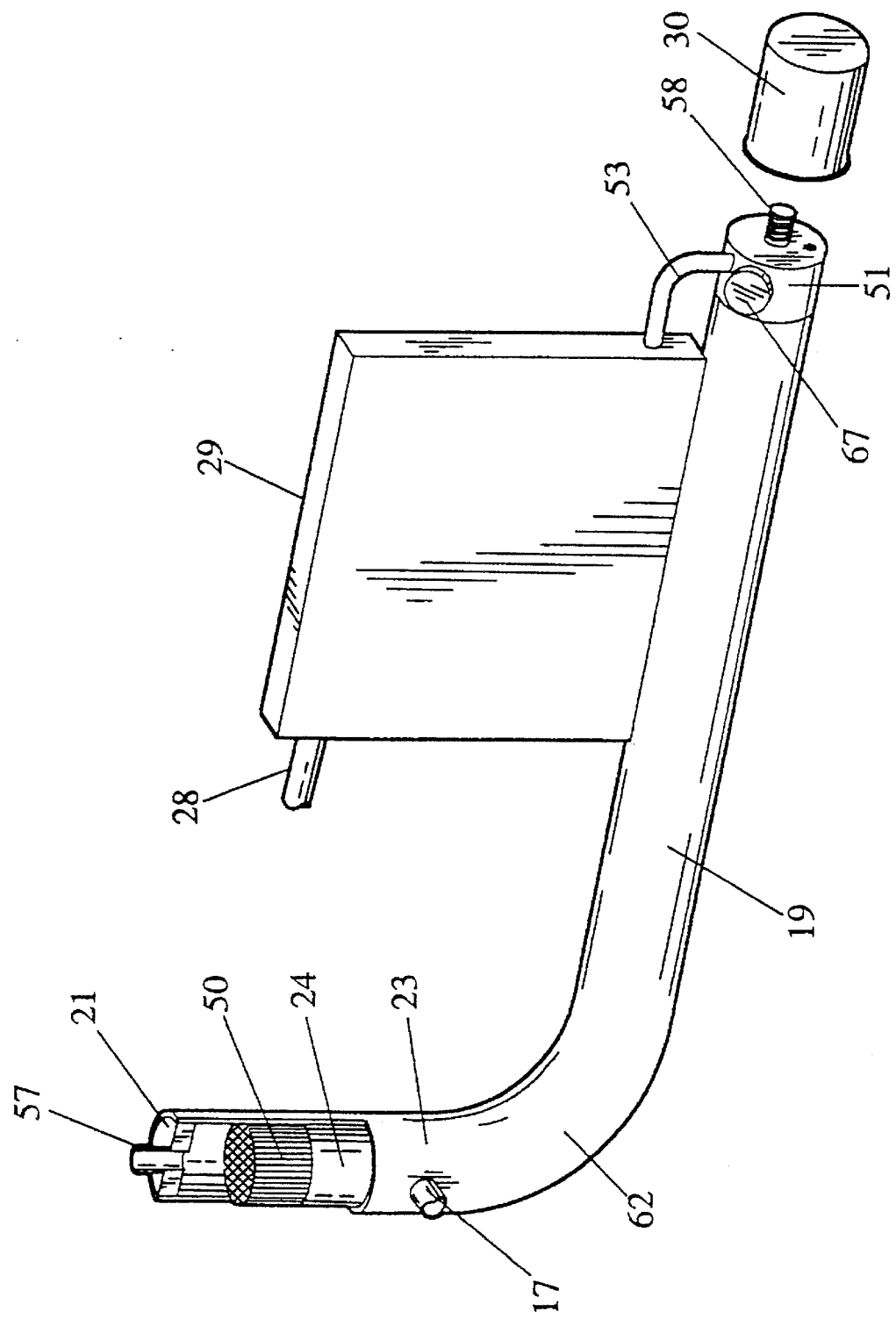
FIGS. 6 and 7 are perspective views of separator units according to the present invention showing still further aspects.
Figure 7:
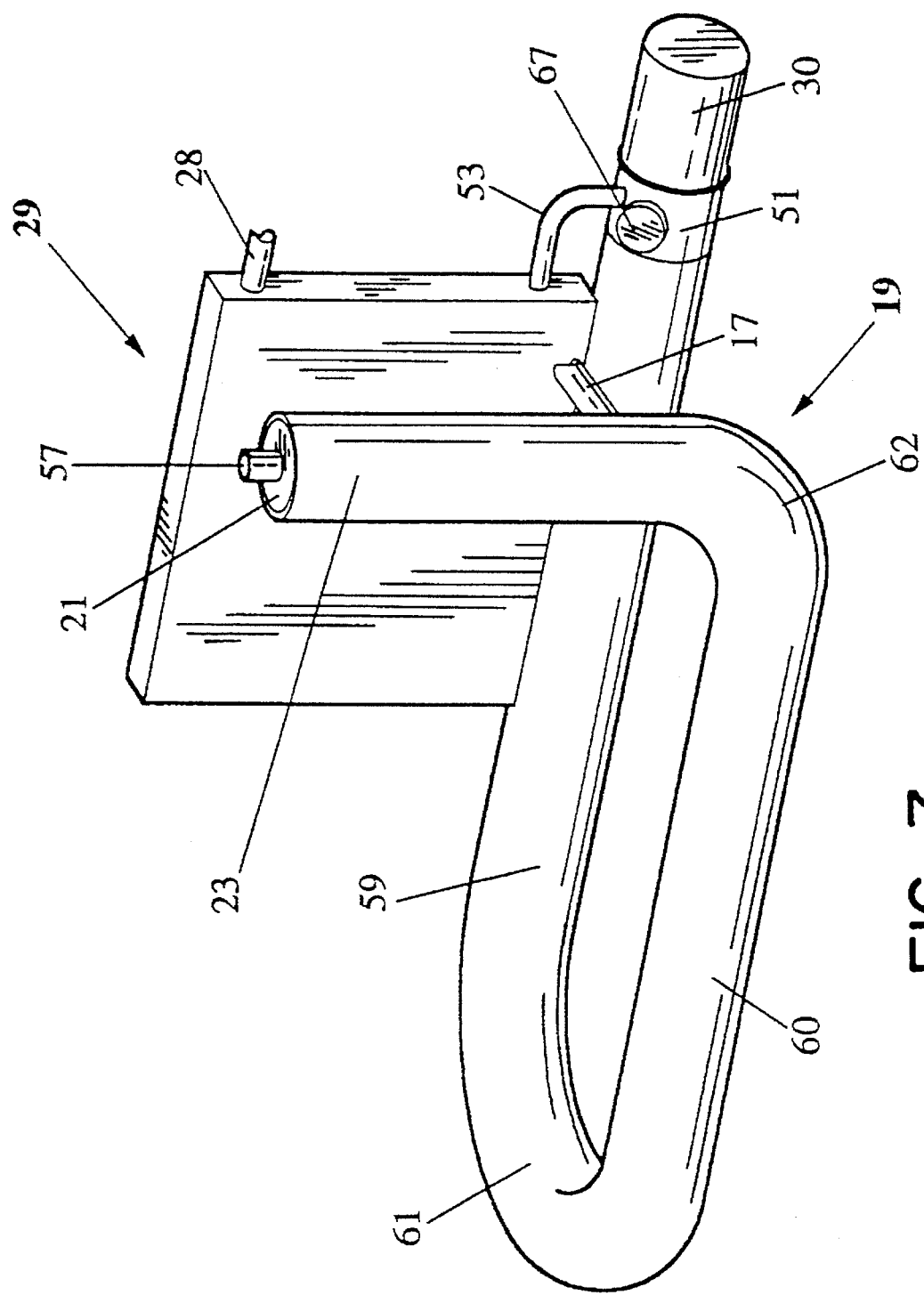

FIGS. 6 to 9 show further preferred embodiments of a separator assembly including a separator vessel 12, cooling unit 29 and oil filter 30 in combination, the assemblies being capable of use in compressor systems as discussed above. In FIG. 6, the separator vessel 12 is formed by a single length of pipe having a horizontal section 19 and a vertical section 23 generally at right angles to the horizontal section 19. The horizontal section 19 is preferably longer than the vertical section 23 to provide an increased volume for the oil retaining zone therein. The upper end of the section 23 has a compressed gas outlet 57 in the end closure 21 and primary separation device 50 which may be YORKMESH (Registered Trade Mark). The other end of the pipe (section 19) is closed by an end closure block 51 that includes a threaded spigot 58 onto which a conventional spin-on oil filter 30 can be mounted, the detail of which is shown in FIGS. 8 and 9. The cooler unit 29 is mounted from the pipe section 19 and receives oil from the filter unit 30 via the block 51 and pipe 53. The cooler unit 29 is preferably as described earlier with reference to FIG. 1A. The cooler unit arrangement shown and described earlier with reference to FIGS. 1 and 2 could also be used but these have the manufacturing disadvantage of having to drill holes in the pipe section 19 to receive the pipes 31 which then need to be welded to the pipe section 19. FIG. 7 is essentially similar to FIG. 6 except that in this case the horizontal section 19 is formed with two adjacent parallel legs 59, 60 joined by a bend 61 so that the horizontal section 19 is essentially located in a horizontal plane. A further bend 62 joins the horizontal section 19 to the vertical section 23 so that the separator vessel is thereby formed from a single length of pipe or conduit. In both cases a pipe connection line 17 enters the vertical section 23 at a position spaced downwardly from the primary separation element 50.

As shown in FIGS. 8 and 9, the end closure block 51 fits into the end of the horizontal pipe section 19 and is welded at 63 thereto. A lower bore 64 provides a passage through the block 51 so that in use oil passes through the bore 64 into and through the oil filter 30 as depicted by the arrows and thereafter through a further passage 65 leading through the block 51 to the pipe 53. As seen in FIG. 9, a further passage 66 is provided leading into the pipe section 19 to allow filling of oil into the separator, a removable cap member 67 is provided to close this passage. The arrangement shown prevents the separator vessel from being over filled with oil as the level cannot be increased beyond the highest level of the passage 66. When it is desired to empty oil from the separator, the oil filter 30 is removed so that oil can simply drain through the bore 64. Conveniently, in a compressor system utilising arrangements disclosed in FIGS. 6 to 9, the oil filter 30 and the oil access passage 66 and closure cap 67 can be located externally of the remainder of the system so as to provide easy access thereto for servicing as required.

We claim:

1. A flooded compressor system for delivering clean compressed gas to an external end user, said system comprising a compressor unit utilising intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a liquid retaining zone formed solely by a length of pipe or conduit having a substantially uniform cross-section along its axial length, said pipe or conduit having a first bend intermediate opposed longitudinal end regions of the pipe or conduit whereby said first bend connects a first substantially horizontal portion of the pipe or conduit defining a liquid holding zone to a second portion of said pipe or conduit extending therefrom to an elevated position located above said first portion, said second portion defining a compressed gas zone, said separator vessel having a vessel inlet means for receiving liquid containing compressed gas from said compressor unit into said second portion of the pipe or conduit and vessel gas outlet means communicating with said second portion of the pipe or conduit, said vessel gas outlet means also communicating with said filter means with said filter means being located externally of said separator vessel.

2. A flooded compressor system according to claim 1 wherein said system further includes a clean compressed gas storage vessel to receive said compressed gas after passing through said filter means.

3. A flooded compressor system according to claim 1 or claim 2 wherein said vessel gas outlet means is located at the longitudinal end region of the second portion of the pipe or conduit.

4. A flooded compressor system according to claim 1 wherein primary liquid separation means is disposed within said separator vessel between the compressed gas zone and said vessel gas outlet means.

5. A flooded compressor system according to claim 4 wherein said primary liquid separation means comprises one or more baffle members located in said second portion of the pipe or conduit.

6. A flooded compressor system for delivering clean compressed gas to an external end user, said system comprising a compressor unit utilising intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a substantially uniform cross-section along its axial length, said vessel having at least one bend intermediate opposed longitudinal end regions of the vessel whereby said at least one bend connects a first substantially horizontal portion of the vessel defining a liquid holding zone to a second portion of said vessel extending therefrom to an elevated position located above said first portion, said second portion defining a compressed gas zone, said compressor system being further characterized by said first substantially horizontal portion of said vessel having at least one further bend so as to define lengths of said vessel adapted to provide a structural base for said compressor system with at least part of said compressor system being mounted from said structural base, said separator vessel further having a vessel inlet means for receiving liquid containing compressed gas from said compressor unit into said second portion of the vessel and vessel gas outlet means communicating with said second portion of the vessel, said vessel gas outlet means also communicating with said filter means with said filter means being located externally of said separator vessel.

7. A compressor system according to claim 6 wherein all parts of said system are mounted directly or indirectly from said structural base.

8. A compressor system according to claim 6 wherein said structural base is formed by at least two lengths of said pipe or conduit joined by said at least one further bend, said at least two lengths of the pipe or conduit being located, in use, in a horizontal plane.

9. A compressor system according to claim 6 wherein said structural base is formed by a circular or semi-circular length of said pipe or conduit located, in use, in a horizontal plane.

10. A compressor system according to claim 6, wherein said vessel is formed by a single length of pipe or conduit.

11. A flooded compressor system according to claim 6 wherein said vessel gas outlet means is located at the longitudinal end region of the second portion of the pipe or conduit.

12. A flooded compressor system according to claim 6 wherein said vessel gas outlet means is located leading from said second portion of the pipe or conduit intermediate the said first bend and the longitudinal end region of the second portion of the pipe or conduit.

13. A flooded compressor system according to claim 11 or claim 12 further including primary liquid separation means disposed within said separator vessel between the compressed gas zone and said vessel gas outlet means.

14. A flooded compressor system for delivering clean compressed gas to an external end user, said system comprising a compressor unit utilising intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a substantially uniform cross-section along its axial length, said vessel having at least one bend intermediate opposed longitudinal end regions of the vessel whereby said at least one bend connects a first substantially horizontal portion of the vessel defining a liquid holding zone to a second portion of said vessel extending therefrom to an elevated position located above said first portion, said second portion defining a compressed gas zone, said compressor system being further characterized by liquid cooler means being integrally formed with said separator vessel, said liquid cooler means including at least one discharge passage leading from said liquid holding zone and heat exchange means arranged to receive liquid from the or each said liquid discharge passage to cool said liquid, said separator vessel further having a vessel inlet means for receiving liquid containing compressed gas from said compressor unit into said second portion of the vessel and vessel gas outlet means communicating with said second portion of the vessel, said vessel gas outlet means also communicating with said filter means with said filter means being located externally of said separator vessel.

15. A flooded compressor system for delivering clean compressed gas to an external end user, said system comprising a compressor unit utilising intermeshing rotors, a separator vessel arranged to receive a mixture of compressed gas and liquid from said compressor unit and to separate liquid from said compressed gas therein a filter means arranged to receive compressed gas from said separator vessel and to pass said compressed gas therethrough for delivery to said external end user, said compressor system being characterized by the separator vessel defining an interior volume having a substantially uniform cross-section along its axial length, said vessel having at least one bend intermediate opposed longitudinal end regions of the vessel whereby said at least one bend connects a first substantially horizontal portion of the vessel defining a liquid holding zone to a second portion of said vessel extending therefrom to an elevated position located above said first portion, said second portion defining a compressed gas zone, said compressor system being further characterized in that the longitudinal end region of said first portion of the vessel is closed by an end member adapted to mount a liquid filter thereto, said end member including passage means which, in use, allows liquid to flow from said liquid holding zone and through said liquid filter to be thereafter returned to said compressor unit, said separator vessel further having a vessel inlet means for receiving liquid containing compressed gas from said compressor unit into said second portion of the vessel and vessel gas outlet means communicating with said second portion of the vessel, said vessel gas outlet means also communicating with said filter means with said filter means being located externally of said separator vessel.

16. A compressor system according to claim 15 wherein the passage means of said end member includes a first passage means to direct liquid flow from said liquid holding zone to said liquid filter and a second passage to direct liquid flow from said liquid filter to liquid cooling means disposed between said separator vessel and said compressor unit.

17. A flooded compressor system for delivering clean compressed gas to an external end user, said system comprising a compressor unit utilizing intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a liquid retaining zone formed solely by a length of pipe or conduit having a substantially uniform cross-section along its axial length, said pipe or conduit having a first bend intermediate opposed longitudinal end regions of the pipe or conduit whereby said first bend connects a first substantially horizontal portion of the pipe or conduit defining a liquid holding zone to a second portion of said pipe or conduit extending therefrom to an elevated position located above said first portion, said second portion defining a compressed gas zone, said separator vessel having a vessel inlet means for receiving liquid containing compressed gas from said compressor unit into said second portion of the pipe or conduit and vessel gas outlet means located leading from said second portion of the pipe or conduit intermediate the said first bend and the longitudinal end region of the second portion of the pipe or conduit, said vessel gas outlet means also communicating with said filter means with said filter means being located externally of said separator vessel.

18. A flooded compressor system according to claim 17 wherein said system further includes a clean compressed gas storage vessel to receive said compressed gas after passing through said filter means.

19. A flooded compressor system according to claim 17 wherein primary liquid separation means is disposed within said separator vessel between the compressed gas zone and said vessel gas outlet means.

20. A flooded compressor system according to claim 19 wherein said primary liquid separation means comprises one or more baffle members located in said second portion of the pipe or conduit.

21. A flooded compressor system according to claim 17 wherein said filter means is mounted to an inlet region of said compressor unit and is arranged to drain liquid collected therein directly into said inlet region of said compressor unit.

22. A flooded compressor system for delivering clean compressed gas to an external end user, said system comprising a compressor unit utilizing intermeshing rotors, a separator vessel arranged to receive a mixture of compressed gas and liquid from said compressor unit and to separate liquid from said compressed gas therein, a filter means arranged to receive compressed gas from said separator vessel and to pass said compressed gas therethrough for delivery to said external end user, said compressor system being characterized by the separator vessel defining an interior volume having a liquid retaining zone formed solely by a length of pipe or conduit having a substantially uniform cross-section along its axial length, said pipe or conduit having a first bend intermediate opposed longitudinal end regions of the pipe or conduit whereby said first bend connects a first substantially horizontal portion of the pipe or conduit defining a liquid holding zone to a second portion of said pipe or conduit extending therefrom to an elevated position located above said first portion, said second portion defining a compressed gas zone, said separator vessel having a vessel inlet means for receiving liquid containing compressed gas from said compressor unit into said second portion of the pipe or conduit and vessel gas outlet means communicating with said second portion of the pipe or conduit, said vessel gas outlet means also communicating with said filter means with said filter means being located externally of said separator vessel and mounted directly to an inlet region of said compressor unit, said filter means being arranged to drain liquid collected therein directly into said inlet region of the compressor unit.

23. A flooded compressor system according to claim 22 wherein said system further includes a clean compressed gas storage vessel to receive said compressed gas after passing through said filter means.

24. A flooded compressor system according to claim 22 or claim 23 wherein said vessel gas outlet means is located at the longitudinal end region of the second portion of the pipe or conduit.

25. A flooded compressor system according to claim 22 or claim 23 wherein said vessel gas outlet means is located leading from said second portion of the pipe or conduit intermediate the said first bend and the longitudinal end region of the second portion of the pipe or conduit.

26. A flooded compressor system according to claim 22 wherein primary liquid separation means is disposed within said separator vessel between the compressed gas zone and said vessel gas outlet means.

27. A flooded compressor system according to claim 26 wherein said primary liquid separation means comprises one or more baffle members located in said second portion of the pipe or conduit.

\* \* \* \* \*